(12) United States Patent
Fernando et al.

(10) Patent No.: US 6,889,060 B2
(45) Date of Patent: May 3, 2005

(54) OPTICAL FIBER BASED ON WIRELESS SCHEME FOR WIDEBAND MULTIMEDIA ACCESS

(75) Inventors: Xavier Navajothy Fernando, Ontario (CA); Abu Bakarr Sesay, Alberta (CA)

(73) Assignee: Telecommunications Research Laboratories, Alberta (CA)

( * ) Notice: Subject to any disclaimer, the term of this patent is extended or adjusted under 35 U.S.C. 154(b) by 355 days.

(21) Appl. No.: 10/134,313

(22) Filed: Apr. 29, 2002

(65) Prior Publication Data

US 2003/0078074 A1 Apr. 24, 2003

Related U.S. Application Data

(60) Provisional application No. 60/301,170, filed on Jun. 28, 2001.

(51) Int. Cl.[7] .............................. H04B 1/38; H04B 1/00; H04B 10/00; H03H 7/30
(52) U.S. Cl. ........................ 455/561; 455/504; 455/63.1; 455/296; 375/229; 375/232; 375/233; 375/348; 398/119; 398/136
(58) Field of Search .............................. 455/561, 501, 455/504, 505–507, 63.1, 65, 67.13, 296, 283, 426; 375/229–235, 346, 348, 341, 343, 349; 333/18; 398/119, 136, 147, 149, 159, 81, 208

(56) References Cited

U.S. PATENT DOCUMENTS

| | | | | |
|---|---|---|---|---|
| 5,226,060 A | * | 7/1993 | Goodson et al. | ............ 375/232 |
| 5,432,816 A | * | 7/1995 | Gozzo | ......................... 375/232 |
| 5,434,883 A | * | 7/1995 | Kimoto et al. | .............. 375/231 |
| 5,471,504 A | * | 11/1995 | Lee et al. | .................... 375/233 |
| 5,900,778 A | * | 5/1999 | Stonick et al. | .............. 330/149 |
| 6,052,349 A | * | 4/2000 | Okamoto | ................. 369/47.26 |
| 6,252,914 B1 | * | 6/2001 | Yamamoto | ................. 375/296 |
| 6,335,767 B1 | * | 1/2002 | Twitchell et al. | ........... 348/608 |
| 6,639,537 B1 | * | 10/2003 | Raz | ............................. 341/155 |

OTHER PUBLICATIONS

Semiconductor Laser's Nonlinearity Compensation for DS–CDMA Optical Transmission System by Post Nonlinearity Recovery Block, Raziq Pervez and Masao Nakagawa, IEICE Transactions on Communications, vol. E79 B, No. 3, Mar. 1996, pp. 424–431.

Nonlinear Distortion Compensation of Microwave Fiber Optic Links with Asymmetric Adaptive Filters, Xavier N. Fernando and Abu B. Sesay, Proceedings of the IEEE International Microwave Symposium, Jun. 2000, 4 pages.

Nonlinear Channel Estimation Using Correlation Properties of PN Sequences, Xavier N. Fernando and Abu B. Sesay, Proceedings of the Canadian Conference on Electrical and Computer Engineering, Toronto, Ontario, May 2001, 6 pages.

Higher order Adaptive filter Characterization of Microwave Fiber Optic link Nonlinearity, Xavier N. Fernando and Abu B. Sesay, Proceedings of SPIE, vol. 3927, Jan. 2000, pp. 39–49.

(Continued)

*Primary Examiner*—Duc M. Nguyen
(74) *Attorney, Agent, or Firm*—Flynn, Thiel, Boutell & Tanis, P.C.

(57) ABSTRACT

A Fiber-wireless uplink consists of a wireless channel followed by a radio-over-fiber (ROF) link. Typically, nonlinear distortion of the ROF link is the major concern when the radio frequency is only a few GHz. This especially severe in the uplink, because of the multipath fading of the wireless channel. A Hammerstein type decision feedback equalizer is described for the fiber wireless uplink, that compensates for nonlinear distortion of the ROF link as well as linear dispersion of the wireless channel. Since the linear and nonlinear parts of the receiver are separated, tracking the fast changing wireless channel is virtually independent of compensating for the relatively static nonlinearity. Analytical results show that the receiver provides excellent compensation with notably less complexity.

13 Claims, 10 Drawing Sheets

OTHER PUBLICATIONS

Higher order Adaptive Filter based Predistortion for Non-linear Distortion Compensation of Radio over Fiber links, Xavier N. Fernando and Abu B. Sesay, Proceedings of the IEEE International Conference on Communications, Jun. 2000, 5 pages.

Crosscorrelation Properties of Pseudorandom and Related Sequences, Dilip V. Sarwate and Michael B. Pursley, Proceedings of the IEEE, vol. 68, No. 5, May 1980, pp. 593–619.

Identification of non–linear systems using correlation analysis and pseudorandom inputs, S.A. Billings and S.Y. Fakhouri, Int. J. Systems Sci., vol. 11, No. 3, 1980, pp. 261–279.

Decision Feedback Equalization, Carlos A. Belfiore and John H. Park, Jr., Proceedings of the IEEE, vol. 67, No. 8, Aug. 1979, pp. 1143–1156.

Identification of Nonlinear Systems Using the Wiener Model, S.A. Billings and S.Y. Fakhouri, Electronic Letters, 1977, 3 pages.

Identification of Systems Containing Linear Dynamic and Static Nonlinear Elements, S.A. Billings and S.Y. Fakhouri, Automatica, vol. 18, No. 1, 1982, pp. 15–26.

A Hammerstein Type Decision Feedback Equalizer for the Fiber–Wireless Uplink, Xavier Fernando and A.B. Sesay, Proceedings of Wireless 2001, $12^{th}$ International Conference on Wireless Communications, Calgary, Jul. 2001, 8 pages.

A Hammerstein Type Equalizer for the Wiener Type Fiber-–Wireless Channel, Xavier N. Fernando and Abu B. Sesay, Proceedings of the Pacific Rim Conference of Computers, Communications and Signal Processing, Victoria, Aug. 2001, pp. 546–549.

Adaptive Filter Theory,Fourth Edition, Chapter 14, Section 2, pp 510 to 520, Prentice Hall, Copyright 1991, 1986.

Look–up Table based Adaptive Predistortion for Dynamic Range Enhancement in a Radio over Fiber Link, Xavier N. Fernando, Abu B. Sesay, p. 26 to 29, Aug., 1999, IEEE.

\* cited by examiner

OPTICAL FIBER BASED ON WIRELESS SCHEME FOR WIDEBAND MULTIMEDIA ACCESS

CROSS-REFERENCE TO RELATED APPLICATIONS

This application claims priority from U.S. provisional No. 60/301,170 filed Jun. 28, 2001.

BACKGROUND OF THE INVENTION

Optical fiber based wireless access schemes have become very popular recently because of their potential to increase system capacity, enable wideband access and to cover special areas such as tunnels and supermarkets. These schemes are especially useful for indoor applications with micro and pico cellular architecture.

When the fiber is short (say, less than a few kilometers) and the radio frequency is only a few GHz, effects of fiber dispersion and laser chirp are negligible [1]. All cited references are listed at the end of this patent disclosure. This is especially true at 1310 nm. Therefore, the ROF link has adequate bandwidth to support wireless multimedia services. In this case, however, nonlinear distortion of the electrical to optical conversion process becomes the major limitation. The impairment is severe in the uplink where, the received signal largely fluctuates due to multipath fading of the wireless channel. Both direct modulation and external modulation schemes suffer from limited dynamic range because of this nonlinear distortion. We focus on AM-AM and AM-PM type nonlinear distortion considering the whole ROF link. However, clipping is neglected.

There have been several attempts to increase the linearity of the ROF link by fixed electronic means [2]. However, fixed schemes suffer from device dependency. We did some work focusing on adaptive compensation of the ROF link nonlinearity, assuming an AWGN wireless channel [3]. However, for a realistic solution wireless channel fading has to be considered also. Recently, we reported an algorithm to identify both the dispersive wireless channel and the nonlinear fiber channel [4].

The nonlinearity of the ROF link contributes to various kinds of impairment. When the negative peak of the modulating signal goes below threshold level, a clipping distortion occurs. In a multicarrier environment, intermodulation distortion also occurs. In addition, even with a single carrier and no clipping, the mild in-band nonlinearity causes AM-AM and AM-PM type nonlinear distortion.

There have been several attempts to increase the linearity of the ROF link by fixed electronic means. These are discussed in detail in [5]. Recently, some work has been done focusing on adaptive compensation of the ROF link nonlinearity, assuming an AWGN wireless channel [3], [6]. However, a good estimation of not only the nonlinearity, but also the multipath wireless channel is essential for efficient equalization.

The fiber-wireless uplink can be modeled as a Wiener system. Reputed mathematician N. Wiener first showed that any BIBO stable nonlinear system with finite memory can be modeled as a Wiener system for Gaussian inputs which, consists of orthogonal linear dynamic functions followed by static nonlinear functions [7].

However, due to the practical difficulties in generating Gaussian inputs, different approaches have been proposed. Pseudorandom (PN) sequences have white noise like properties and, easy to generate and analyze. Their correlation properties are well understood [8]. Besides, maximal length PN sequences are widely used in spread spectrum communications. Therefore, using PN sequence for channel estimation is very attractive in wireless communications. Billings and Fakhouri initially used PN sequences for control system identification [9].

SUMMARY OF THE INVENTION

This invention provides a Hammerstein type decision feedback equalizer (HDFE) for use in a Wiener type communications system, as for example the fiber wireless uplink of a radio over fiber (ROF) wireless communications system. The HDFE compensates separately for nonlinear distortion of the ROF link as well as linear dispersion of the wireless channel. Since the linear and nonlinear parts of the receiver are separated, tracking the fast changing wireless channel is virtually independent of compensating for the relatively static nonlinearity. Analytical results show that the receiver provides excellent compensation with notably less complexity.

The invention finds use in a central base station of a communications network, wherein the central base station communicates over a channel with multiple portable units, the channel having a channel impulse response and the channel contributing linear and nonlinear distortion to a signal x(n) transmitted over the channel. An HDFE comprises a polynomial filter for receiving signals from the portable units and for producing an output signal z(n) that is compensated for nonlinear channel distortion; and a filter section following the polynomial filter for compensating for linear channel distortion. The polynomial filter is preferably memoryless and configured to apply a polynomial having polynomial coefficients $g_i$ calculated from the signals received from the portable units, preferably without explicitly estimating a polynomial that characterizes the channel.

Preferably, the equalizer is configured to calculate the polynomial coefficients gi by:

estimating the channel impulse response h(n), preferably by using correlation properties of PN sequences, and, even more preferably using a Vandermonde matrix approach with projection of linear and nonlinear coefficients of the feedforward filter and the feedback filter onto different subspaces;

correlating the channel impulse response h(n) with the signal x(n) transmitted over the channel to produce a signal q(n); and selecting the coefficients $g_i$ so that the output z(n) of the polynomial filter is proportional to q(n).

The coefficients of the polynomial may be selected by a method from the group consisting of QR decomposition and an adaptive technique. The filter section is preferably a decision feedback equalizer having a feedforward filter and a feedback filter.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present.

Figure 1:
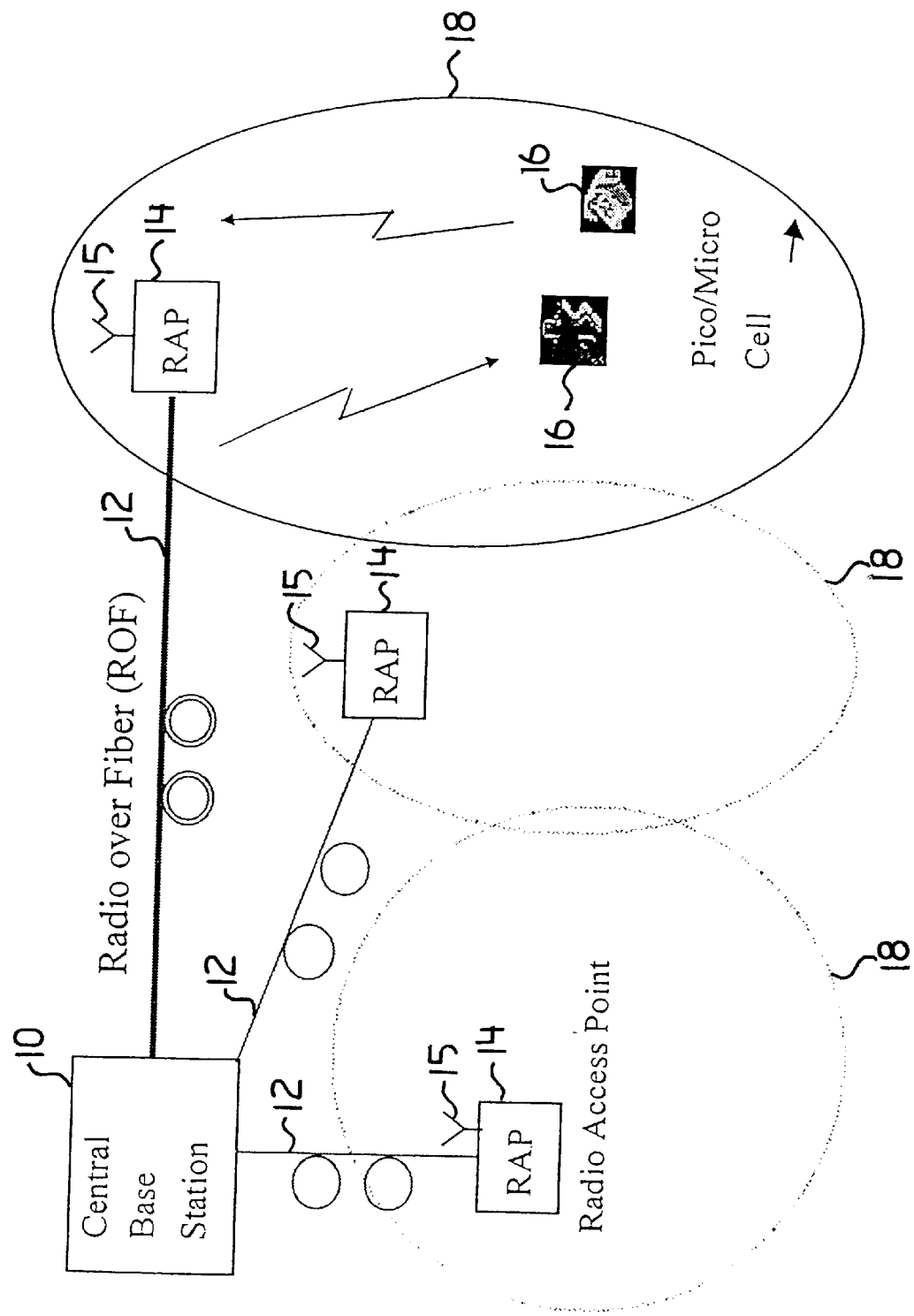
FIG. 1 shows an optical fiber based wireless access scheme to support wireless multimedia access and to increase the capacity.

Referring to FIG. 1, there is shown an optical fiber based wireless scheme for wideband multimedia access. A central base station 10 communicates over radio over fiber links 12 with a number of radio access points 14. Each radio access point 14 serves portable wireless units 16 in a micro-cell or pico-cell 18 whose footprint may be in the order of tens of meters.

According to the invention, a Hammerstein type decision feedback equalizer (HDFE) is used for the fiber-wireless uplink. This receiver individually compensates for both nonlinear distortion and the time dispersion. It has a unique architecture with notably less complexity, nevertheless its performance is close to the performance of a standard DFE in a linear channel.

The decision Feedback equalizer (DFE) has been very successful in wireless communications, thanks to its robustness in mitigating commonly encountered spectral nulls in frequency selective fading channels. Strictly speaking the basic DFE itself is nonlinear because of the decision device and the feedback loop [10]. However, it is important to note that, although the basic DFE is nonlinear, it is effective in equalizing only linear channels. Besides, both the feedback and the feed forward filters in the basic DFE are linear. When the channel itself is nonlinear with AM-AM and AM-PM type distortions, the basic DFE has to be enhanced in some way to accommodate the additional nonlinearity.

Figure 2:
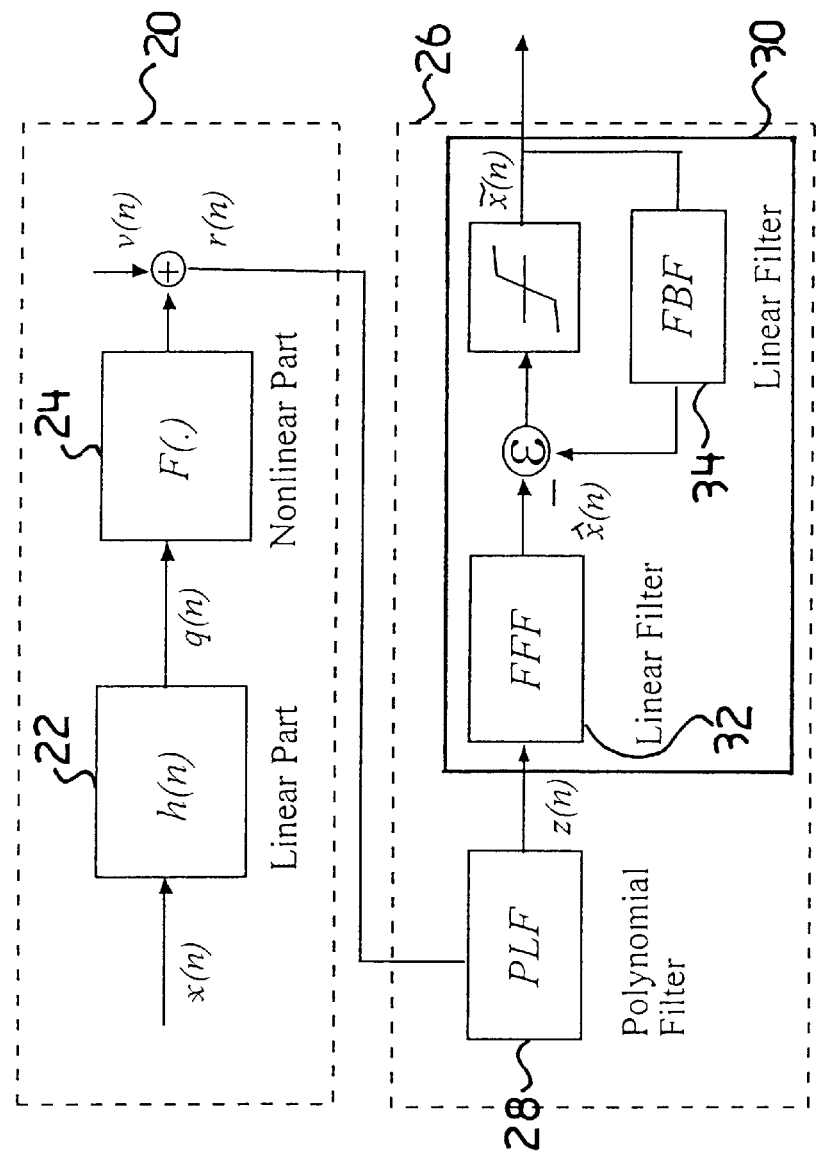
FIG. 2 shows a schematic of a fiber-wireless uplink with the Hammerstein type DFE.

Mathematically, an equalizer should have an exact inverse of the channel structure. Referring to FIG. 2, the fiber-wireless uplink 20 consists of a linear dynamic system 22 (the wireless channel) followed by a static nonlinear system 24 (the optical channel). Therefore, it can be modeled as a Wiener system. The inverse of a Wiener system is a Hammerstein system. Furthermore, the fiber-wireless channel has the following properties:

1. The wireless channel 22 varies relatively fast. This implies that the compensation should follow it in real time.
2. The nonlinearity comes from a laser diode (not shown) and from an RF amplifier (not shown) in the fiber-wireless uplink 20. Hence, it is almost stationary. That means the nonlinear compensation needs to be updated only occasionally.

From the foregoing, an efficient equalizer should separately compensate for linear and nonlinear distortions. A receiver 26 that accomplishes this intention is shown in FIG. 2 including a polynomial filter (PLF) 28 for receiving signals from the portable units 16 and for producing an output signal z(n) that is compensated for nonlinear channel distortion and a filter section 30 following the polynomial filter 28 for compensating for linear channel distortion. PLF 28 is a memoryless polynomial filter of order N. The filter section 30 includes a linear feed forward filter 32 (FFF) and a linear feedback filter 34 (FBF), both with memory. This is a novel receiver architecture for the fiber-wireless uplink 20 where, an inverse of a polynomial implemented by the PLF 28 models the optical link nonlinearity while the rest compensates for the wireless channel dispersion.

As shown in FIG. 2, x(n) is the transmitted data from the portable unit; h(n) is the impulse response of the (linear) wireless channel 22; q(n) is the signal received at remote antennas 15 at the radio access points 14. The antennas 15 are connected to conventional optical modulators (not shown) on the fibers 12. Note that q(n) is an internal signal that is not accessible. At the central base station 10, the optical signal is converted back to electrical signal which, we denote as r(n). This r(n) is available at the receiver. The nonlinear transfer function of the complete optical link, denoted by F(.), maps q(n) to r(n) so that, r(n)=F[q(n)]+v(n). All the electrical and optical noise is appropriately transferred to the input of the receiver and denoted by v(n). The optimization of the DFE involves the selection of the parameters of the polynomial filter 28 as well as of the linear filters 32, 34 in the filter section 30.

Referring to FIG. 2, the output of the polynomial filter z(n) has the form, $$z(n) = g_0 + g_1 r(n) + g_2 r^2(n) + \ldots g_N r^N(n) \quad (1)$$

There are no delay terms since we assume no memory for the filter. The weights $g_i$ ($0 \leq i \leq N$) have to be determined such that, this polynomial is an inverse of the channel nonlinearity F(.). Equivalently, z(n) should be made proportional to q(n).

The inverse polynomial is preferably generated from the received signal r(n) without explicitly estimating the channel polynomial. This is accomplished as follows: first, the linear channel impulse response h(n) is estimated as described below. Then, q(n) is determined by convolving the given x(n) with this h(n). Knowing both q(n) and r(n), the output z(n) can be made proportional to the q(n) by appropriately selecting each $g_i$. This can be done for example either by a standard QR decomposition method or by adaptive techniques as shown for example in [14].

In a QR decomposition method, first, r(n) is expanded into a Vandermonde matrix Vr of $N_L$ rows and (N+1) columns. Here, $N_L$ is the number of sample points in r(n).

$$V_r = \begin{bmatrix} 1 & r(1) & r^2(1) & \ldots & r^{N-1}(1) & r^N(1) \\ 1 & r(2) & r^2(2) & \ldots & r^{N-1}(2) & r^N(2) \\ 1 & \ldots & \ldots & \ldots & \ldots & \ldots \\ \ldots & \ldots & \ldots & \ldots & \ldots & \ldots \\ 1 & r(N_L) & r^2(N_L) & \ldots & r^{N-1}(N_L) & r^N(N_L) \end{bmatrix} \quad (2)$$

A vector q and a vector G are defined as, $$q = [q(1) q(2) q(3) \ldots q(N_L)]^T$$

$$G = [g_0 g_1 g_2 \ldots g_N]^T \qquad (2)$$

Now, the target is to determine the weights of the vector G such that, $V_r G = z$ where, z is an estimate of q. An efficient way of computing G is to perform an orthogonal-triangular decomposition of the Vandermonde matrix $V_r$ such that it can be ten as:

$$V_r = Q_r R_r \qquad (3)$$

Now, from the properties of $R_r$ and $Q_r$, we have $$R_r G = Q_r^T z \qquad (4)$$

Note that $Q_r^T z$ is a vector of length (N+1). Since $R_r$ is a triangular matrix, this equation can be efficiently solved for G by back substitution. The optimal filter order N is selected by increasing N iteratively until the error $\in_p = q-z$ is sufficiently small.

Weights of both the F F F and F B F are optimized jointly. Referring to FIG. 2, define the combined data input vector to the linear filters as, $$U_L = [z^T x^T]^T \text{ where,} \qquad (5)$$

$$z = [z(-N_f + 1) z(-N_f + 2) \ldots z(0)]^T \text{ and}$$

$$x = [x(1) \ x(2) \ldots x(N_b)]^T.$$

$N_f$ and $N_b$ are the number of taps in F F F and F B F respectively.

The combined weight vector of both the filters is given by $W = [W_f^T W_b^T]^T$, where, $W_f = [w_{-N_f+1} \ w_{-N_f+2} \ldots w_0]^T$ and $W_b = [1 \ w_1 \ldots w_{N_b}]^T$. Thus, the estimate data is, $$\hat{x}(n) = U_L^T W \qquad (6)$$

The MSE, which is a function of filter lengths, is given by, $$J_l(N_f, N_b) = E[x(n) - \hat{x}(n)]^2 \qquad (7)$$

The necessary and sufficient condition for the minimum of the MSE is given by $$E[U_L(x(n) - U_L^T W)] = 0 \qquad (8)$$

or, equivalently, $$E[U_L U_L^T] W = E[x(n) U_L] \qquad (9)$$

If the auto-correlation matrix of the input vector $U_L$ is $R_{uu}$ and the cross correlation vector between $U_L$ and the desired response x(n) is p then, the optimum weights are given by, $$W = R_{uu}^{-1} p \qquad (10)$$

We evaluate the MMSE performance of the polynomial filter in detail and the final BER curves are given. The complete evaluation of the whole receiver including the linear filters can be found in [11].

The mean square value of the polynomial filter $\in_p(n) = z(n) - q(n)$ is, $$J_p = E[\in_p^2] = \overline{z^2(n) - 2z(n)q(n) + q^2(n)} \qquad (11)$$

Let us assume an independently and identically distributed (iid) data sequence x(n). Furthermore, let us assume $x(n) \in \{-1, 1\} \forall n$ with equal probability and no correlation between x(n) and $x(m) \forall m \neq n$. Then it can be shown that the expectation of all powers of q(n) are zero. Expectations of even powers depend on the channel impulse response. The results are summarized as follows: Let us define a general symbol $$\sigma_h^i \text{ as } \sigma_h^i = \sum_{m=-L_b}^{L_f} h^i(m) \text{ then,}$$

$$E[q^i] = \begin{cases} \sigma_h^i & \text{if } i \text{ even} \\ 0 & \text{if } i \text{ odd} \end{cases} \qquad (12)$$

where, i is a positive integer. For convenience, the timing notation (n) is dropped in the above expression and hereafter, with an understanding that the manipulation is done at the discrete time instance n.

Now, consider the channel nonlinearity $$r = \sum_{i=1}^{l} A_i q^i + v.$$

We need to consider only odd order terms because the even order nonlinearities will generate harmonics that are at least one octave away from the carrier frequency. In this case r can be written as, $$r = \sum_{i=0}^{(l-1)/2} A_{2i+1} q^{2i+1} + v \qquad (13)$$

Because, r has only odd power terms of q, raising r to an odd power results in weighted sums of only odd power terms of q. Since expectation of the odd power terms of q are zero, $$E[r^i(n)] = 0 \ i \in 1, 3, 5, 7, \ldots, \infty \qquad (14)$$

Here, zero mean, signal independent noise is assumed. Higher (even) order expectations of r for a given l can be computed from the expression, $$E[r^{2j}] = E\left[\left\{\sum_{i=0}^{(l-1)/2} A_{2i+1} q^{2i+1} + v\right\}^{2j}\right] \qquad (15)$$

where, j is a positive integer.

The next task is to compute the higher order expectations of z. Using (1) and the property in (14), it can be shown that $$E[z^2] = \sum_{i=1}^{N} g_i^2 \sigma_r^{2i} + \sum_{\substack{i,j=1 \\ i \neq j; i+j = even}} g_i g_j \sigma_r^{i+j} \quad (16)$$

Now, the task is to find $$E[zq] = \sum_{i=1}^{N} g_i E[r^i q].$$

For this, first we find the expectation of rq=r×q. Again the assumption that l is odd and noise is not correlated with the signal gives $$E[rq] = \sum_{i=0}^{(l-1)/2} A_{2i+1} \sigma_h^{2i+2} \quad (17)$$

Note that, although $E[r]=0$, $E[rq] \neq 0$. However, for the second order, $E[r^2 q]=0$, because it consists of only odd power terms of q. Similarly, all the even order expectations such as, $E[r^4 q]$, $E[r^6 q]$ etc. are zero. Odd order expectations can be computed from (18) where, j is a positive integer.

$$E[r^{2j-1} q] = E\left[ q \left\{ \sum_{i=0}^{(l-1)/2} A_{2i+1} q^{2i+1} + v \right\}^{2j-1} \right] \quad (18)$$

Finally, substituting all these results in (11) the mean squared error of the polynomial filter is given by (19). Note that, in (19) the $J_p$ is a function of channel impulse response h(n), direct and inverse polynomial coefficients $A_i$, $g_i$ and the noise power $\sigma_v^2$.

$$J_p = E[z^2] - 2E[zq] + E[q^2] \quad (19)$$

$$= \sum_{i=1}^{N} g_i^2 \sigma_r^{2i} + \sum_{\substack{i,j=1 \\ i \neq j; i+j = even}} g_i g_j \sigma_r^{i+j} -$$

$$2 \sum_{i=1}^{N} g_i E[r^i q] + \sigma_h^2$$

Let us evaluate the $J_p$ under the worst and the best conditions. Let l=1 and N=1, so that there is no nonlinearity. Then, taking $g_l = A_l = 1$ and substituting, $J_{p=\sigma_v^2}$. This is the best value for $J_p$. In all other cases $J_p > \sigma_v^2$. This shows the noise power is the lower bound of the PLF MSE, irrespective of h(n). However, as soon as l>1, $J_p$ is a function of h(n) also.

Figure 3:
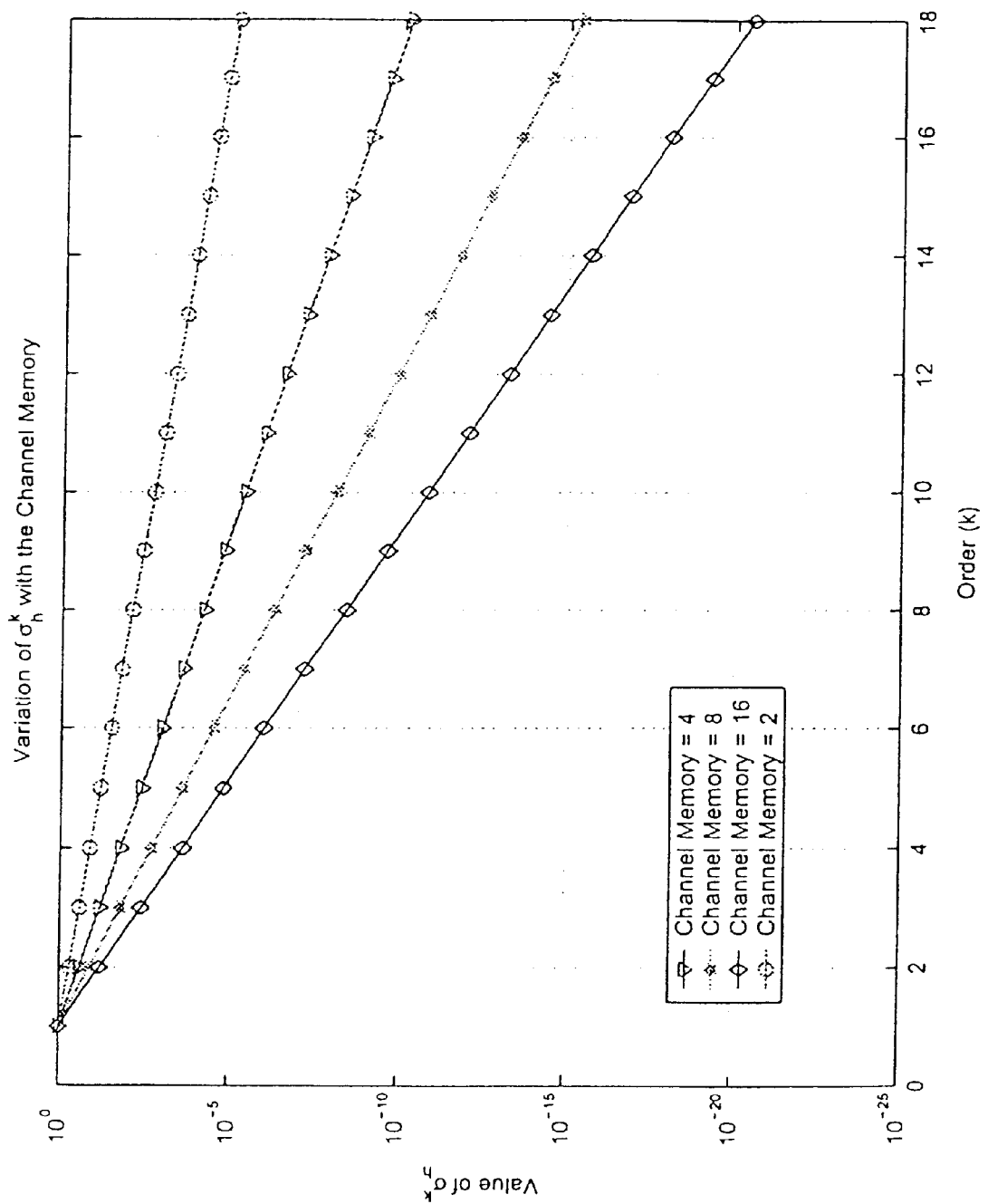
FIG. 3 is a graph showing higher order expectations of the channel impulse response.
Figure 4:
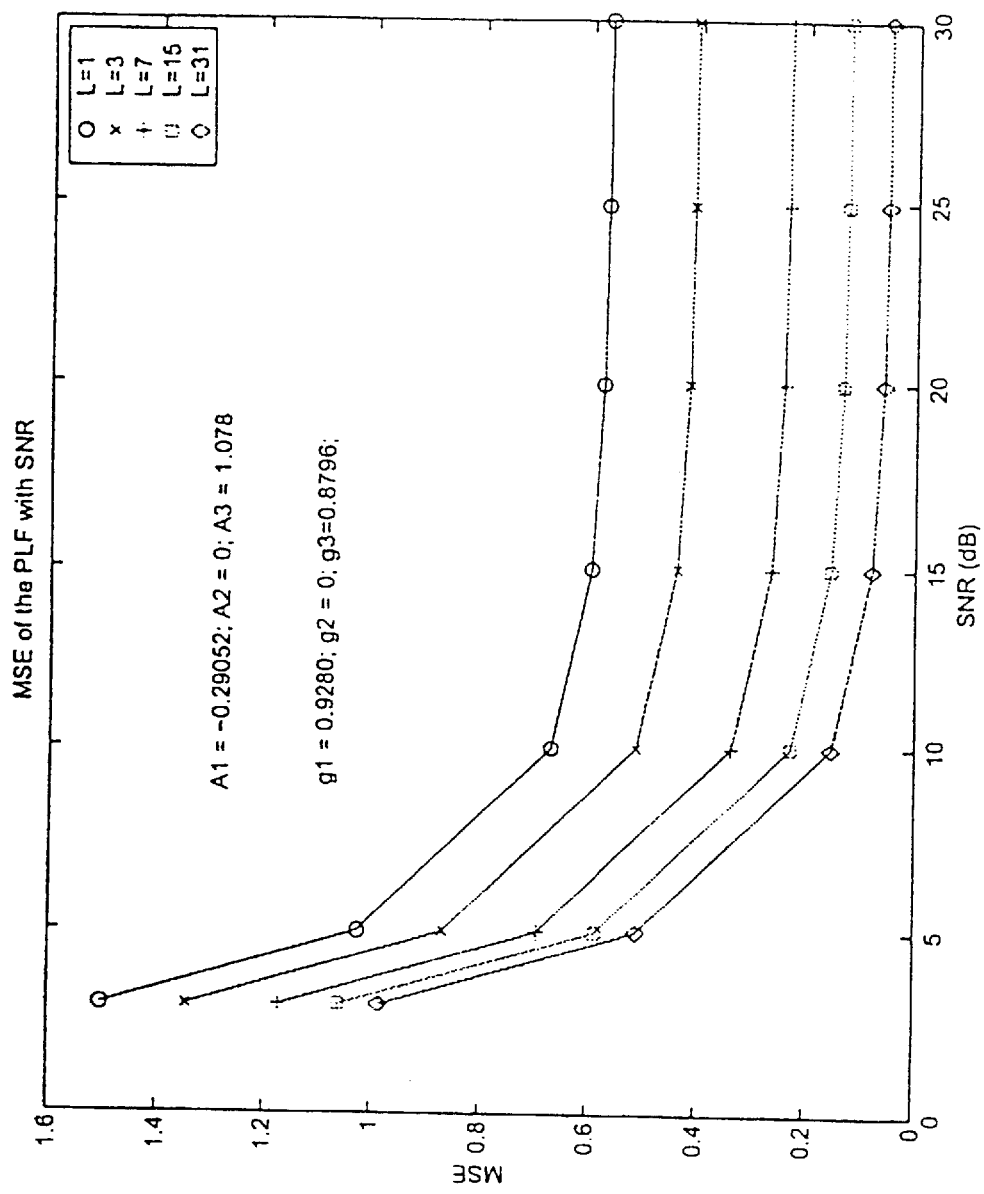
FIG. 4 is a graph showing mean squared error of the polynomial filter Vs SNR as a function of channel memory L.
Figure 5:
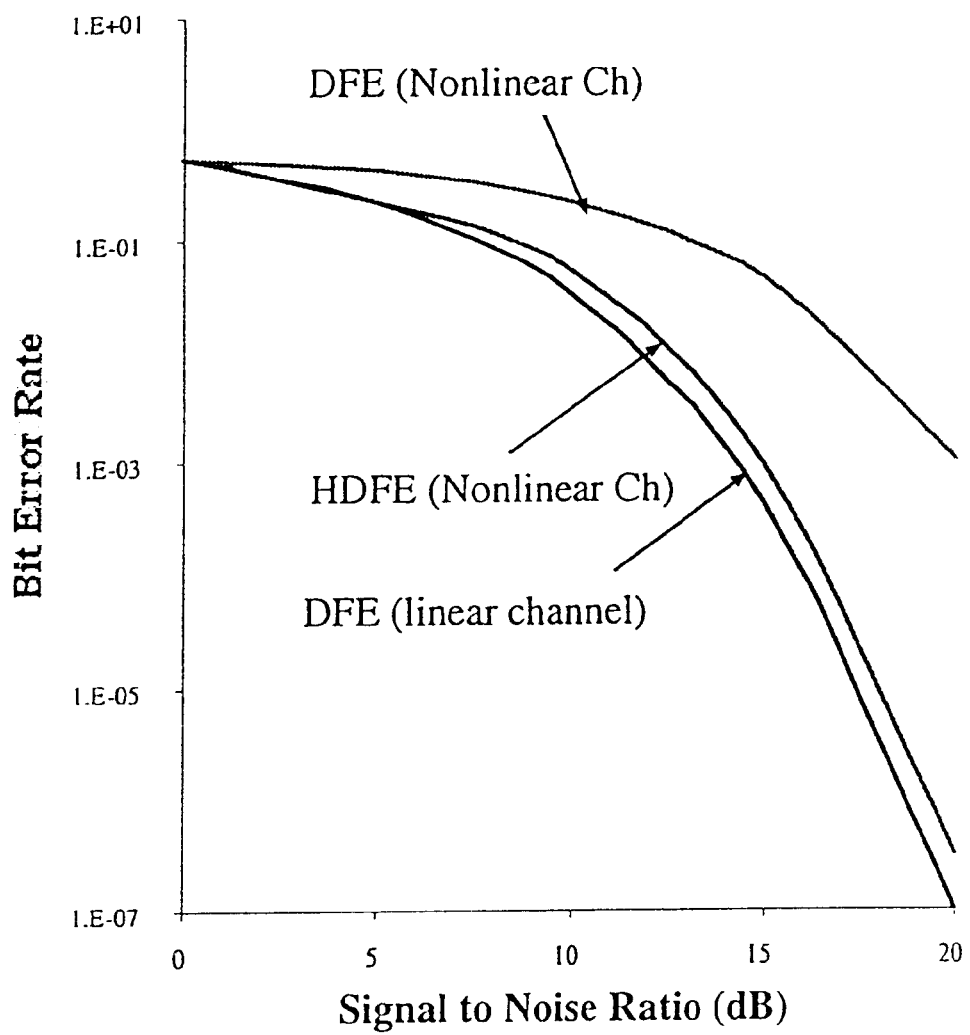
FIG. 5 is a graph showing BER performance of the HDFE and a standard DFE.

In both FIG. 3 and FIG. 4 a worst case multipath dispersion is assumed. That is, all paths have equal strength. Examples are, if L=2 then h=[0.5 0.5]. If L=4 then h=[0.25 0.25 0.25 0.25]. FIG. 3 shows the variation of $\sigma_h^k$. As the order k increases the $\sigma_h^k$ exponentially decreases. The rate is high with a larger channel memory because of the equal gain distribution. From FIG. 4, the MSE floor decreases with the increment in the channel memory. This is because, MSE is a function of $\sigma_h^k$. As a result the HDFE compensates for the nonlinearity better when there are more paths each with small gain. Finally, FIG. 5 shows the BER performance of the HDFE and a conventional DFE with $N_b=L$ and $N_f \gg L$. Even when the channel is nonlinear, the HDFE performance is very close to that of a DFE in a linear channel. The mismatch is due the PLF error.

Here we estimate both the nonlinear transfer function of the ROF link 20 and linear impulse response h(n) of the wireless channel 22 from the autocovariance properties of PN sequences. Instead of using higher order correlation functions to directly estimate higher order Volterra kernels, which lead to anomalies [9], we have used a more efficient Vandermonde matrix approach to separate the Volterra kernels. Furthermore, projection of linear and nonlinear coefficients onto different subspaces makes the tracking of fast changing wireless channel and the relatively static nonlinear channel virtually independent.

Simulation results show excellent estimation with just a few training symbols. Since, the order of the nonlinearity is independent to the dimension of the Vandermonde matrix, the length of the training sequence is independent of the order of the nonlinearity.

Figure 6:
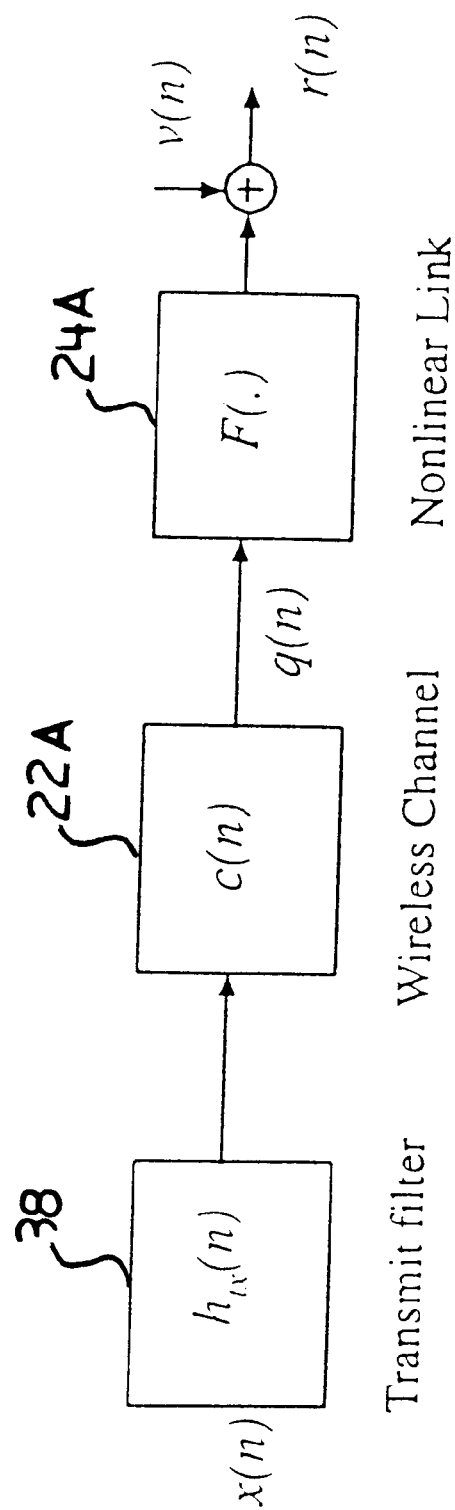
FIG. 6 is a schematic showing a Fibre-Wireless Uplink.

A model of the fiber-wireless uplink is shown in FIG. 6. A transmit filter 38 is located in the portable unit 16. The wireless channel 22A is an indoor multipath channel that is modeled with a tapped delay line filter. The nonlinear link function 24A F(.) models the complete optical link from the laser diode (not shown, but is at the radio access point 14) to an optical receiver (not shown) at the central station 10, including an RF amplifier after a photo-detector.

Assume that F(.) is continuous within the given dynamic range. Then from Weierstrass theorem, F(.) can be uniformly approximated by a polynomial of order l with an arbitrary precision $\in > 0$. Thus, $$r(n) = A_1 q(n) + A_2 q^2(n) + \ldots A_l q^l(n) + v(n) \quad (20)$$

where, v(n) is the summation of all the optical and wireless channel noise. Let us define the combined linear impulse response h(n) as, $$h(n) = h_{tx}(n) * c(n) \quad (21)$$

Thus, the internal signal q(n) is given as, $$q(n) = x(n) * h(n) \quad (22)$$

The received signal r(n) is a nonlinear translation of q(n) plus noise, $$r(n) = F[q(n)] + v(n) \quad (23)$$

r(n) also can be written as a sum of individual higher order terms $w_i(n)$.

$$r(n) = w_1 + (n) + w_2(n) + w_3(n) + \ldots w_l(n) + v(n) \quad (24)$$

where, $$w_1(n) = A_1 \sum_{m=-\infty}^{\infty} h(m) x(n-m) \quad (25)$$

$$w_2(n) = A_2 \sum_{m_1=-\infty}^{\infty} h(m_1) x(n-m_1) \sum_{m_2=-\infty}^{\infty} h(m_2) x(n-m_2) \quad (26)$$

Finally, $$w_l(n) = A_l \sum_{m_1=-\infty}^{\infty} \cdots \sum_{m_l=-\infty}^{\infty} \prod_{i=1}^{l} h(m_i) x(n - m_i) \quad (27)$$

Expressing in this form facilitates separation of corresponding Volterra kernels [9]. Let us define the $i^{th}$ order separable Volterra kernel $g_i$ as, $$g_i(m_1, m_2, \ldots, m_i) = A_i \sum_{\tau=-\infty}^{\infty} \prod_{i=1}^{i} h(m_j - \tau) \quad (28)$$

This general definition includes the memory term $\tau$. However in our model we assume no memory for $F(.)$. Using this kernel description, the general term $w_i(1 \leq i \leq 1)$ can be written as, $$w_i(n) = \sum_{m_i=-\infty}^{\infty} \cdots \sum_{m_i=-\infty}^{\infty} g_i(m_1, m_2, \ldots, m_i) \prod_{j=1}^{i} x(n - m_j). \quad (29)$$

Therefore, for a given transmitted sequence $x(n)$, the received signal $r(n)$ consists of higher order terms of the present and previous samples that are multiplied with each other.

From equations (29) and (24), the received signal $r(n)$ can be written as, $$r(n) = \sum_{i=1}^{l} \sum_{m_i=-\infty}^{\infty} \cdots \sum_{m_i=-\infty}^{\infty} g_i(m_1, m_2, \ldots m_i) \prod_{j=1}^{i} x(n - m_j) + v(n) \quad (30)$$

where, $x(n)$ is a PN sequence of length $N_c$. As shown previously $r(n)$ also can be written simply as, $$r(n) = \sum_{i=1}^{l} w_i(n) + v(n) \quad (31)$$

Let $rr(n) = r(n) - \overline{r(n)}$ and $xx(n) = x(n) - \overline{x(n)}$ that are zero mean processes. The cross covariance of $r$ and $x$, $\mathfrak{R}_{rx}$ is computed as, $$\mathfrak{R}_{rx}(\sigma) = \overline{rr(n)xx(n-\sigma)} \quad (32)$$

The zero mean process $rr(n)$ can now be written as, $$rr(n) = \sum_{i=1}^{l} \sum_{m_1=-\infty}^{\infty} \cdots \sum_{m_i=-\infty}^{\infty} g_i(m_1, m_2, \ldots m_i)$$

$$\left[ \prod_{i=1}^{i} x(n - m_j) - \prod_{i=1}^{i} \overline{x(n - m_j)} \right] + v(n) \quad (33)$$

(If we assume no correlation between the additive noise $v(n)$ and the input sequence $x(n)$, then the covariance function $\mathfrak{R}_{rx}(\sigma)$ can be written as, $$\mathfrak{R}_{rx}(\sigma) = \overline{\sum_{i=1}^{l} \sum_{m_1=-\infty}^{\infty} \cdots \sum_{m_i=-\infty}^{\infty} g_i(m_1, m_2, \ldots m_i) \cdot \left[ \prod_{j=1}^{i} x(n - m_j) - \prod_{j=1}^{i} \overline{x(n - m_j)} \right] [x(n - \sigma) - \overline{x(n - \sigma)}]} \quad (34)$$

Equation (34) above, is actually a summation of the cross correlations of $xx(n)$ with each $w_i(n)$ of $rr(n)$. This can be simply written as, $$\mathfrak{R}_{rx}(\sigma) = \sum_{i=1}^{l} \mathfrak{R}_{w_i x}(\sigma) \quad (35)$$

However, if $\mathfrak{R}_{rx}(\sigma)$ is evaluated directly as defined above, it leads to anomalies ([9], [13]). This is because, $\mathfrak{R}_{rx}(\sigma)$ involves higher order correlation functions of pseudorandom sequences, which is not always computable [8]. This problem can be avoided by isolating the first order covariance function $\mathfrak{R}_{w_1 x}(\sigma)$ from the rest by some means.

For multilevel transmission, the easiest approach is to repeat the training a few (say $N_t$) times with different amplitudes. This approach was originally proposed by Billings [9]. This procedure effectively generates a system of $N_t$ simultaneous equations instead of a single equation which, enables solving for the $\mathfrak{R}_{w_1 x}(\sigma)$ without computing higher order correlation functions. Let us consider multilevel input signals $\alpha_i x(n)$ where, $\alpha_i \neq \alpha_j \forall i \neq j$ Then, $$\mathfrak{R}_{r_{\alpha_i} x}(\sigma) = \sum_{j=1}^{N_t} \alpha_i^j \mathfrak{R}_{w_j x}(\sigma) \; i = 1, 2, \ldots, N_t \quad (36)$$

Note that $N_t$ does not have to be the same as the order of the nonlinearity, since $N_t$ is not directly used to compute the polynomial coefficients. The value of $N_t$ can be as low as 2 or 3. The simulation shows excellent results with $N_t = 3$. Expanding equation (36) in matrix form gives, $$\begin{bmatrix} \mathfrak{R}_{r\alpha_1 x}(\sigma) \\ \mathfrak{R}_{r\alpha_2 x}(\sigma) \\ \vdots \\ \mathfrak{R}_{r\alpha_{N_t} x}(\sigma) \end{bmatrix} = \begin{bmatrix} \alpha_1 & \alpha_1^2 & \cdots & \alpha_1^{N_t} \\ \alpha_2 & \alpha_2^2 & \cdots & \alpha_2^{N_t} \\ \vdots & \vdots & \vdots & \vdots \\ \alpha_{N_t} & \alpha_{N_t}^2 & \cdots & \alpha_{N_t}^{N_t} \end{bmatrix} \begin{bmatrix} \mathfrak{R}_{w_1 x}(\sigma) \\ \mathfrak{R}_{w_2 x}(\sigma) \\ \vdots \\ \mathfrak{R}_{w_{N_t} x}(\sigma) \end{bmatrix} \quad (37)$$

The coefficient matrix $\alpha$ can be re-written as, $$\begin{bmatrix} \alpha_1 & 0 & \cdots & 0 \\ 0 & \alpha_2 & \cdots & 0 \\ 0 & 0 & \cdots & \cdots \\ \cdots & \cdots & \cdot & \cdots \\ 0 & \cdots & \cdots & \alpha_{N_t} \end{bmatrix} \begin{bmatrix} 1 & \alpha_1 & \alpha_1^2 & \cdots & \alpha_1^{N_t-1} \\ 1 & \alpha_2 & \alpha_2^2 & \cdots & \alpha_2^{N_t-1} \\ \vdots & \vdots & \vdots & \vdots & \vdots \\ 1 & \alpha_{N_t} & \alpha_{N_t}^2 & \cdots & \alpha_{N_t}^{N_t-1} \end{bmatrix}$$

The first diagonal matrix above, is non-singular for all $\alpha_i \neq 0$. The second matrix is the well known Vandermonde matrix. The determinant of the Vandermonde matrix is given below, which is non zero for $\alpha_i \neq \alpha_j$ $$R_{w_1x}(\sigma) = A_1 \sum_{m=-\infty}^{\infty} h(m) R_{xx}(\sigma - m) \tag{38}$$

Thus for every value of $\alpha$, equation (36) has a unique solution for $\Re_{w_1x}(\sigma)$; $i=1,2,\ldots, N_t$ Now from equations (6), $\Re_{w_1x}(\sigma)$ can be written as $$R_{xx}(\sigma) = \sum_{m_1=0}^{N_c-1} x(n)x(n+\sigma) \tag{39}$$

where, $\Re_{xx}(\sigma)$ is the auto-covariance of the PN sequence x(n) that is defined as [8], $$R_{xx}(\sigma) = \begin{cases} 1 & \text{if } \sigma = 0 \bmod N_c \\ -1/N_c & \text{if } \sigma \neq 0 \bmod N_c \end{cases} \tag{40}$$

The function $\Re_{xx}(\sigma)$ is periodic and can be easily determined if it is a maximal length sequence. In this case, since x(n) has unit amplitude, $$\prod_{1 \leq i \leq j \leq N_t} (\alpha_i - \alpha_j)$$

Assume chip level synchronization is achieved and $N_c \gg 1$. If the correlation is computed within the time period $0 \leq n \leq N_c - 1$, then $\Re_{xx}(\sigma)$ can be written as $\Re_{xx}(\sigma) = \delta(\sigma)$, Therefore, the equation (38) simplifies to, $$R_{w_1x}(\sigma) = A_1 \sum_{m=0}^{N_c-1} h(m) \delta(\sigma - m) \tag{41}$$

Using the convolution properties of the impulse function,
$$\Re_{w_1x}(\sigma) = A_1 h(m) \tag{42}$$

Using equation (42), the impulse response of the unknown linear channel h(n) multiplied with the linear gain $A_1$ of the nonlinear channel can be computed. Note that the length of the PN sequence, must be larger than the channel memory for a complete identification of h(n).

Having identified the linear part of the Wiener system, the task is to identify the nonlinear part. Referring to FIG. 2, the transmitted training sequence x(n) is known; the impulse response of the linear part h(n) has been estimated as shown in the last section. Thus, the unknown internal signal q(n)=x(n)*h(n), can be estimated. The output of the nonlinear part r(n) is known to the receiver. Now, the task is to use an appropriate curve fitting algorithm such as a least squares polynomial fit to estimate the polynomial coefficients $A_i(1 \leq i \leq l)$ of the nonlinear part F(.).

In the least squares curve fitting method, the goal is to fit a set of sample points to a polynomial, so that the squared error between the actual sample points and the polynomial estimate is minimized. This method requires the order of the polynomial l to be smaller than the number of sample points $N_L$, which is a very loose condition (usually $l \ll N_L$). The problem is equivalent to solving an over determined system with $N_L$ equations and l unknowns in the least squares sense. Here, $N_L = N_c * N_t$.

Let the estimated signal $\hat{r}(n)$ be given as a function of the estimated coefficients $\hat{A}_i$, $$\hat{r}(n) = \hat{A}_1 q(n) + \hat{A}_2 q^2(n) + \ldots \hat{A}_l q^l(n) + v(n) \tag{43}$$

Now, the target is to find a polynomial coefficient vector $\hat{A}$ of length (l+1) in a least squares sense such that, $$\hat{A} = \arg\left[\min_{\hat{A}} \sum_{i=1}^{N_L} [r_i - \hat{r}_i(q_i; \hat{A}_0 \ldots \hat{A}_l)]^2 \right] \tag{44}$$

Let us define vectors q and r of length $N_L$, that are made up of the signals q(n) and r(n) respectively. Also, let us define a Vandermonde matrix V, such that each row of V is a polynomial of the corresponding data point in q. V has $N_L$ rows and (l+1) columns and is given by, $$V = \begin{bmatrix} q^l(1) & q^{l-1}(1) & \cdots & q(1) & 1 \\ q^l(2) & q^{l-1}(2) & \cdots & q(2) & 1 \\ \cdots & \cdots & \cdots & \cdots & 1 \\ \cdots & \cdots & \cdots & \cdots & \cdots \\ q^l(N_L) & q^{l-1}(N_L) & \cdots & q(N_L) & 1 \end{bmatrix} \tag{45}$$

Minimization of the sum of squared errors in equation (44) yields, $$V\hat{A} = \hat{r} \tag{46}$$

An efficient way of computing $\hat{A}$ is performing an orthogonal triangular decomposition of the Vandermonde matrix V so that it can be written as, $$V = QR \tag{47}$$

where, R is an upper triangular matrix and Q is an orthonormal matrix that has the same dimension as V. The above decomposition yields, $$QR\hat{A} = \hat{r} \tag{48}$$

Since the unitary matrix Q has the property that $Q^T = Q^{-1}$, this simplifies to, $$R\hat{A} = Q^T \hat{r} \tag{49}$$

Note that $Q^T r$ is a vector of length (l+1). Thus, since R is a triangular matrix, this equation can be easily solved for $\hat{A}$ by back substitution. The mean error between the actual data r(n) and the computed data is given by:

$$\in = r - V\hat{A} \tag{50}$$

Finally, the order of the polynomial l and number and distribution of the data points has to be selected to minimize the mean squared error.

To evaluate the algorithm, a simulation was run by assuming different channel impulse responses and different nonlinear characteristics. The Simulink™ in Matlab™ environment is used for simulation.

Figure 7:
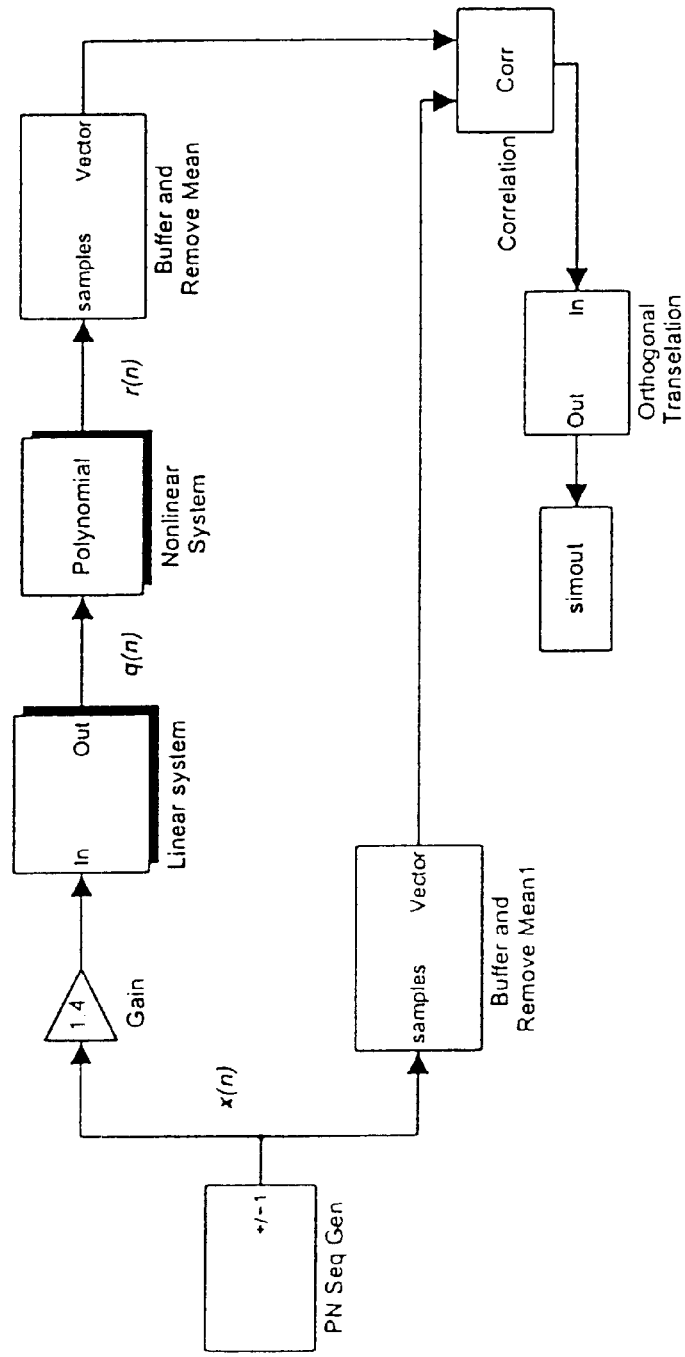
FIG. 7 is a block diagram showing a simulation model of the method of channel estimation according to an embodiment of the invention.

The block diagram used for simulation is shown in FIG. 7. A PN sequence x(n) is generated from the generator block. The gain block simulates the input level coefficient α. The linear system is a discrete tap-delay line filter. The nonlinear system is modeled by a polynomial function. An infinite signal to noise ratio is used. The received signal r(n) is stored at a buffer of memory $N_c$. $N_c$ is taken as 31. The cross correlation is performed after removing the mean of the buffered r(n) and x(n). The output is $\Re_{r_\alpha x}^1(\sigma)$. This is stored and the simulation is repeated with a different α value. The values used were α=1,1.2 and 1.4. Then $\Re_{w_p x}(\sigma)$ is calculated using the previously derived relationship.

Two different impulse responses h(n) are used. One with four paths and the other with eight paths. These are given below, $$h(n)=\delta(n)-0.8\delta(n-7)+0.6\delta(n-13)-0.4\delta(n-17) \quad (51)$$

$$h(n)=\delta(n)-0.8\delta(n-5)+0.6\delta(n-9)-0.4\delta(n-11)+0.3\delta(n-14)-0.5\delta(n-17)+0.4\delta(n-21)+0.1\delta(n-25) \quad (52)$$

Figure 8:
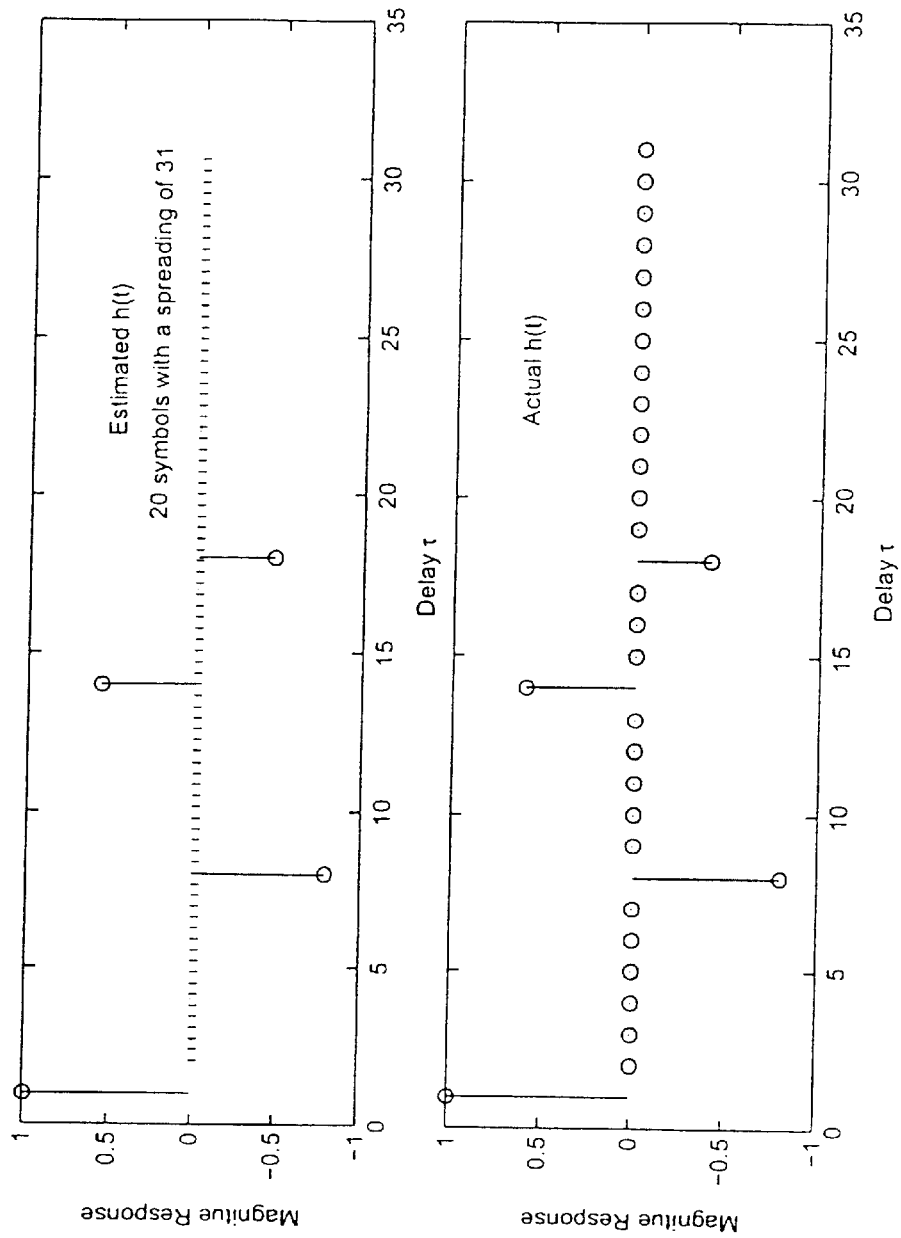
FIG. 8 is a graph showing actual and estimated impulse responses for a four path impulse response.
Figure 9:
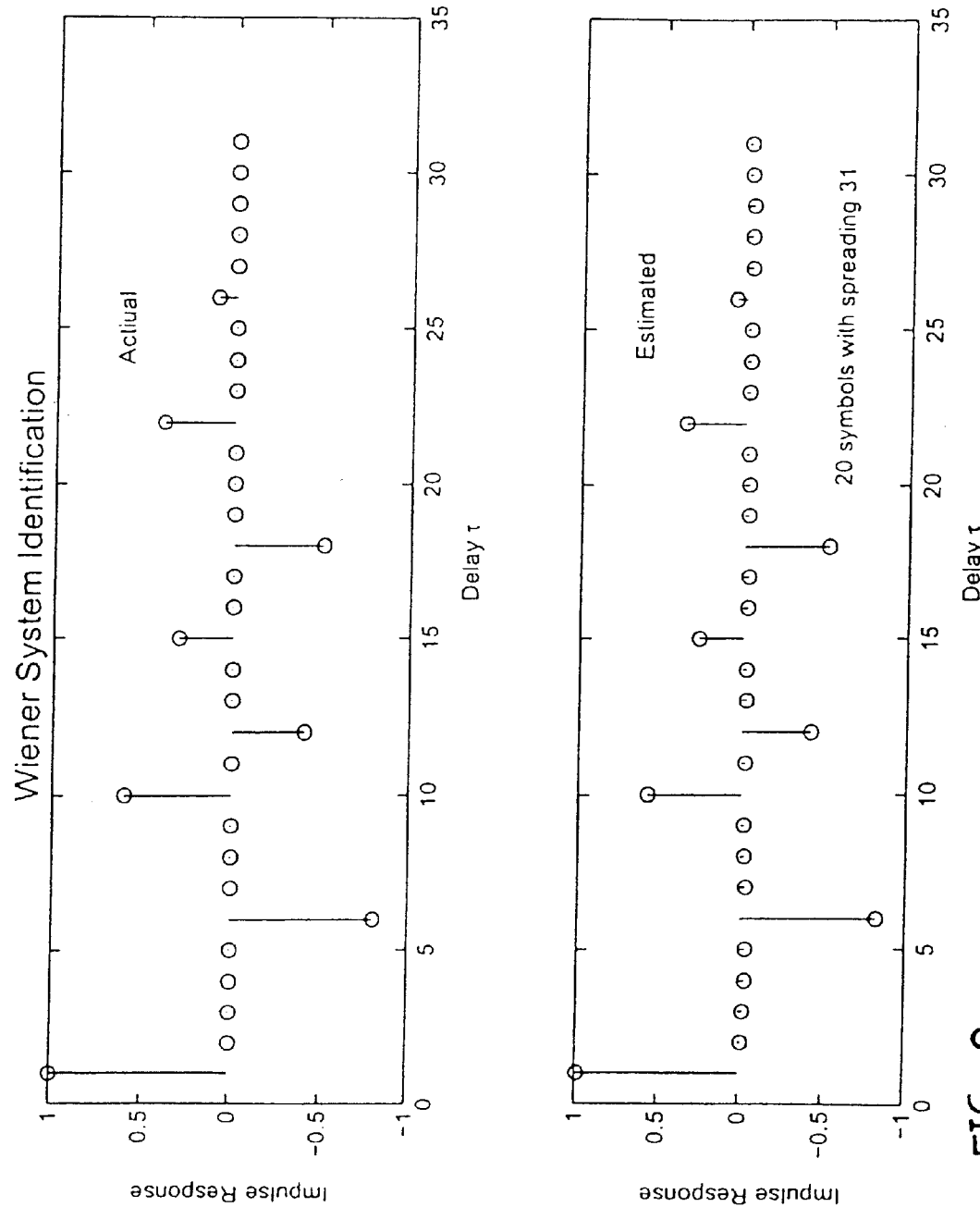
FIG. 9 is a graph showing actual and estimated impulse responses for an eight path impulse response.

The original impulse response and the estimated impulse responses are shown in FIG. 8 and FIG. 9 respectively.

Comparing the theoretical and simulation results, it can be seen that the proposed algorithm is very efficient in identifying Wiener type nonlinear systems. The number of levels α is independent of the order of nonlinearity. We used 20 symbols for training which, gives pretty good results. Even fewer symbols are enough depending on the accuracy required. Ideally (when there is no noise and with perfect numerical precision), one symbol is enough for identification. Here, the sampling rate is the same as the chip rate.

Thus, the resolution of the impulse response depends on the chip time. However, the memory of the channel can be as long as the length of the PN sequence.

Identification of the linear and nonlinear systems are found to be quite independent. Two different nonlinear systems are used for the simulation. A fourth order (even) system, $$r(n)=-0.6q^4(n)+1.2q^2(n) \quad (53)$$

and a third order (odd) system, $$r(n)=-0.35q^3(n)+q(n) \quad (54)$$

Figure 10:
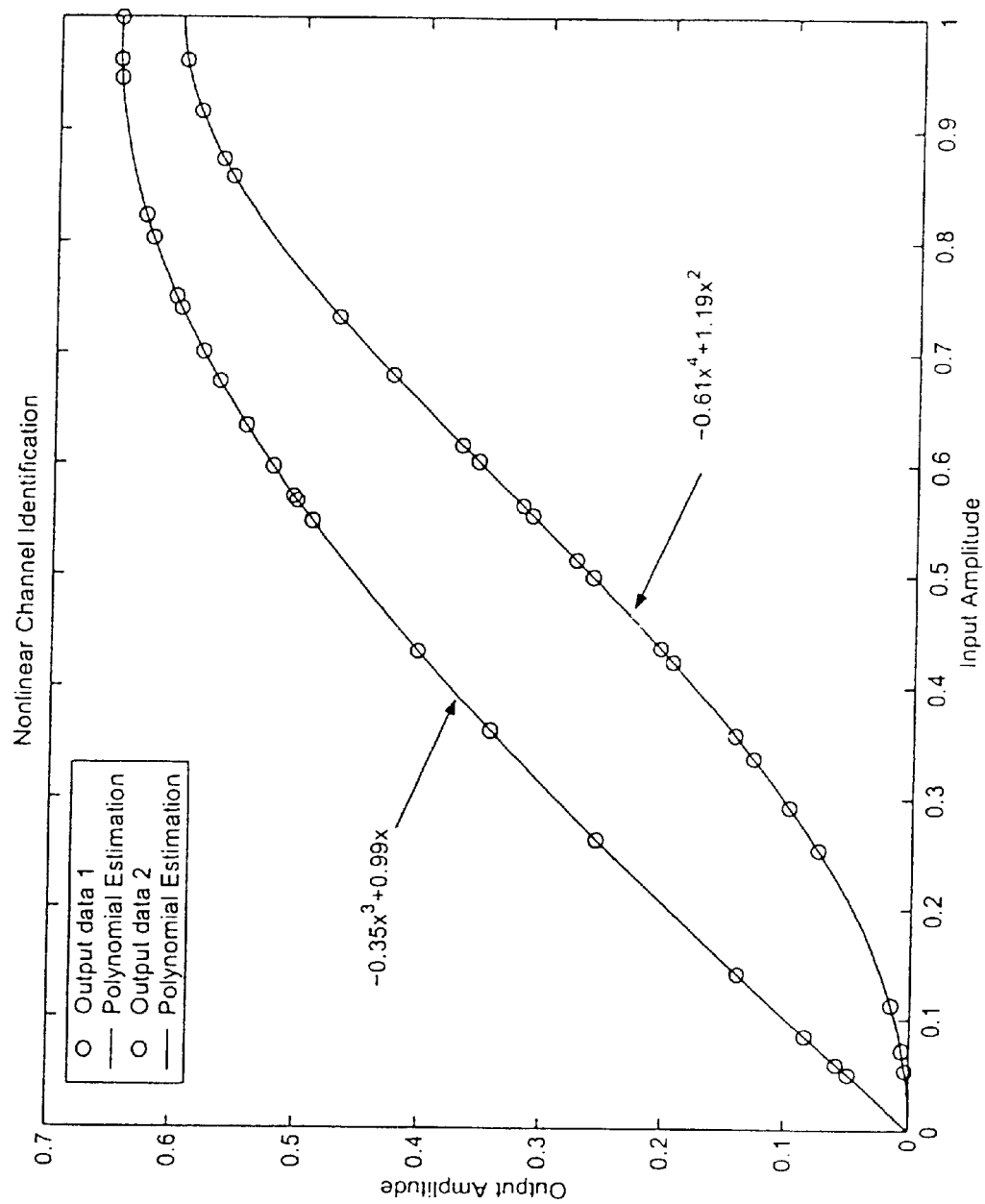
FIG. 10 is a graph showing received data and an estimated polynomial using an embodiment of the invention.

The received symbols r(n) and the estimated curves, using the orthogonal triangular decomposition algorithm, are shown in FIG. 10. The estimated polynomials from the received data using the decomposition algorithm are, $$r(n)=-0.61q^4(n)+1.19q^2(n) \quad (55)$$

$$r(n)=-0.35q^3(n)+0.99q(n) \quad (56)$$

These are very close to the original polynomials.

It is important to mention that the shape of the nonlinearity is immaterial for the algorithm to work. It always identifies the exact curve. However, we need sample points that span the whole dynamic range of interest. This is better achieved when the linear channel has severe multipath conditions because, the received symbols will then exhibit large amplitude fluctuations. If this is not the case then we may have to increase the number of levels α, so that the entire dynamic range is covered. The computational complexity of the nonlinear identification depends on the number of received sample points $N_t$ and the order of the polynomial l.

As seen from the foregoing, we have described here a unique Hammerstein type decision-feedback-equalizer (HDFE) to compensate for distortions of the combined fiber-wireless uplink (FIG. 2.). This is the first time any such attempt is made. The receiver has two parts. First, it estimates both the fiber and the wireless channels individually using auto-covariance properties of PN sequences. The complete algorithm is described above. Then, it performs compensation for this combined fiber-wireless channel. This is also described above.

The HDFE has the following advantages: It compensates for the nonlinearity of the whole ROF link, not just the laser diode (contrast to some previous work). The compensation is done at baseband, so that the clock speed of the DSP chip can be slower. Being a baseband scheme, the receiver architecture is independent of the radio frequency. The receiver architecture is independent of ROF link parameters like wavelength and type of optical modulation used, as long as the memoryless assumption holds. This is an adaptive scheme. Therefore, the receiver adapts itself to compensate for different ROF links. The receiver tracks any modification or drift in the ROF link parameters. The receiver architecture separates the compensation of the fast changing wireless channel from the relatively static fiber channel. This has the advantage that, the polynomial filter coefficients have to be updated only occasionally compared to linear filter coefficients. In a multiuser environment, everybody shares the same fiber channel but each user has different wireless channel. In this case, a single polynomial filter is sufficient for all users, only the linear filters have to be different for different users. The BER performance of the HDFE in the fiber-wireless channel is close to that of a standard DFE in a linear channel.

Finally, the HDFE equalizer is applicable to any Wiener type nonlinear channel. A Wiener system has a time dispersive system such as a wireless channel or a coaxial cable followed by a static memoryless nonlinear system. These types of channels are common in digital communications.

References:

[1] Bob Davies, *Optical Single Sideband for Broadband and Subcarrier Systems*, Ph.D. thesis, University of Alberta, 2000

[2] Raziq Pervez and Masao Nakagawa. "Semiconductor laser's nonlinearity compensation for DS=CDMA optical transmission system by post nonlinearity recovery. Block," IECIE Transactions on Communications, vol. E-79 B, no. 3, March 1996.

[3] Xavier Fernando and Abu Sesay, "Nonlinear distortion compensation of microwave fiber optic links with asymmetric adaptive filters," in *Proceedings of the IEEE International Microwave Symposium*, June 2000.

[4] Xavier Fernando and Abu Sesay, "Nonlinear channel estimation using correlation properties of PN sequences," in *Proceedings of the Canadian Conference on Electrical and Computer Engineering*), Toronto, ON, May 2001.

[5] Xavier Fernando and Abu Sesay, "Higher order adaptive filter characterization of microwave fiber optic link nonlinearity," in *Proceedings of the SPIE, The International Society of for Optical Engineering*, January 2000, vol. 3927, pp. 39–49.

[6] Xavier Fernando and Abu Sesay, "Higher order adaptive filter based predistortion for nonlinear distortion compensation of radio over fiber links," in *Proceedings of the IEEE International Conference on Communications*, June 2000.

[7] Norbert wiener, *Nonlinear Problems in Random Theory*, Technology press of MIT and John Wiley and Sons Inc. New York, 1958.

[8] D. V. Sarwate and M. B. Pursley, "Crosscorrelation properties of pseudorandom and related sequences," *Proceedings of the IEEE*, 1980,

[9] S. A. Billings and S. Y. Fakhouri, "Identification of nonlinear systems using correlation analysis of pseudorandom inputs," *Int. J. Systems Science*, 1980

[10] C. A. Belfiore and J. H. Park Jr., "Decision feedback equalization," *Proceedings of the IEEE*, vol. 67, no. 8, pp. 1143–1156, 1979.

[11] Xavier Fernando, *An Optical Fiber Based Wireless Access Scheme with Asymmetry*, Phd. Thesis, University of Calgary, 2001

[12] S. A. Billings and S. Y. Fakhouri, "Identification of nonlinear systems using the wiener model," *Electronic letters*, 1977

[13] S. A. Billings and S. Y. Fakhouri, "Identification of systems containing linear dynamic and static nonlinear elements," *Automatica*, 1982.

[14] Simon Haykin, Adaptive Filter Theory, Prentice-Hall, New Jersey, 2002 (pages 513–520)

All references cited herein are incorporated by reference.

Immaterial modifications may be made to the invention described here without departing from the essence of the invention.

We claim:

1. In a central base station of a communications network, wherein the central base station communicates over a channel with multiple portable units, the channel having a channel impulse response h(n) and the channel contributing linear and nonlinear distortion to a signal x(n) transmitted over the channel, an equalizer comprising:

a polynomial filter for receiving signals from the portable units and for producing an output signal z(n) that is compensated for nonlinear channel distortion; and a filter section following the polynomial filter for compensating for linear channel distortion.

2. In the central base station of claim 1, the polynomial filter being configured to apply a polynomial having polynomial coefficients $g_i$ calculated from the signals received from the portable units.

3. In the central base station of claim 2, the polynomial coefficients being calculated without explicitly estimating a polynomial that characterizes the channel.

4. In the central base station of claim 3, the equalizer being configured to calculate the polynomial coefficients $g_i$ by:

estimating the channel impulse response h(n);

correlating the channel impulse response h(n) with the signal x(n) transmitted over the channel to produce a signal q(n); and selecting the coefficients $g_i$ so that the output signal z(n) of the polynomial filter is proportional to q(n).

5. In the central base station of claim 4, the coefficients of the polynomial being selected by a method from the group consisting of QR decomposition and an adaptive technique.

6. In the central base station of claim 5, the coefficients of the polynomial being selected by QR decomposition.

7. In the central base station of claim 4, the equalizer being a baseband equalizer.

8. In the central base station of claim 1, the polynomial filter being memoryless.

9. In the central base station of claim 1, the filter section being a decision feedback equalizer having a feedforward filter and a feedback filter.

10. In the central base station of claim 1, the equalizer being configured to estimate the channel impulse response h(n) by using correlation properties of PN sequences.

11. In the central base station of claim 10, the correlation properties being determined using a Vandermonde matrix approach with projection of linear and nonlinear coefficients of a feedforward filter and a feedback filter of said filter section onto different subspaces.

12. In the central base station of claim 1, the equalizer being configured to adapt to a channel that incorporates a radio link that contributes a linear distortion to the channel.

13. In the central base station of claim 12, the equalizer being configured to adapt to a channel that incorporates an optical fiber link that contributes a nonlinear distortion to the channel.

* * * * *